United States Patent
Jaradi et al.

(10) Patent No.: US 10,518,739 B2
(45) Date of Patent: Dec. 31, 2019

(54) SEATBELT ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 15/871,360

(22) Filed: Jan. 15, 2018

(65) Prior Publication Data

US 2019/0217809 A1 Jul. 18, 2019

(51) Int. Cl.
| | |
|---|---|
| *A62B 35/00* | (2006.01) |
| *B60R 21/18* | (2006.01) |
| *B60R 22/06* | (2006.01) |
| *B60R 22/26* | (2006.01) |
| *B60R 22/18* | (2006.01) |

(52) U.S. Cl.
CPC ............... *B60R 22/06* (2013.01); *B60R 22/26* (2013.01); *B60R 2022/1806* (2013.01)

(58) Field of Classification Search
CPC .. B60N 2/2812; B60N 2/2821; B60N 2/2803; B60N 2/2806; B60R 22/26; B60R 22/04; B64D 11/06
See application file for complete search history.

(56) References Cited

U.S. PATENT DOCUMENTS

| | | | |
|---|---|---|---|
| 3,613,819 A | 10/1971 | Maloney | |
| 3,653,714 A | 4/1972 | Gentile | |
| 3,781,061 A | 12/1973 | Walz et al. | |
| 3,794,135 A | 2/1974 | Ewert et al. | |
| 3,795,411 A | 3/1974 | Takada | |
| 3,897,082 A | 7/1975 | Takada et al. | |
| 4,542,919 A * | 9/1985 | Else | B60R 22/04 280/804 |
| 5,286,091 A * | 2/1994 | Busch | B60R 21/02 297/464 |
| 5,393,091 A * | 2/1995 | Tanaka | B60R 21/18 280/733 |
| 5,540,482 A * | 7/1996 | Baret | B60N 2/14 297/344.22 |
| 6,189,921 B1 * | 2/2001 | Takeuchi | B60R 21/18 280/733 |

(Continued)

OTHER PUBLICATIONS driverless.global article entitled "Driverless Autonomous Vehicle Technology—Autonomous Seat Belts for Autonomous vehicles!" © Driverless.global 2017, https://www.driverless.global/video/114-brilliant-autonomous-seat-belts-for-autonomous-vehicles.

*Primary Examiner* — Shin H Kim
(74) *Attorney, Agent, or Firm* — Frank A. MacKenzie; Bejin Bieneman PLC

(57) ABSTRACT

An assembly includes a seat. The assembly includes a buckle supported by the seat. The assembly includes a buckle mechanism pivotable relative to the seat between a stowed position and a latching position, and having a carrier movable between a retracted position and an extended position. The assembly includes a latch plate supported by the carrier and engaged with the buckle when the buckle mechanism is in the latching position and the carrier is in the extended position.

20 Claims, 14 Drawing Sheets

(56) References Cited

U.S. PATENT DOCUMENTS

| | | | | |
|---|---|---|---|---|
| 6,244,621 | B1* | 6/2001 | Kameyoshi | B60R 21/18 280/733 |
| 6,336,656 | B1* | 1/2002 | Romeo | B60R 21/18 280/733 |
| 6,439,601 | B1* | 8/2002 | Iseki | B60R 21/18 280/733 |
| 7,398,995 | B2* | 7/2008 | Kokeguchi | B60R 21/18 280/730.1 |
| 7,874,582 | B2* | 1/2011 | Murakami | B60R 21/18 280/728.2 |
| 8,882,141 | B2* | 11/2014 | Arnold | B60R 21/18 280/733 |
| 2001/0045731 | A1* | 11/2001 | Iseki | B60R 21/18 280/733 |
| 2002/0074789 | A1* | 6/2002 | Carraway, Jr. | B60R 22/04 280/804 |
| 2002/0125701 | A1* | 9/2002 | Devonport | B60R 21/18 280/733 |
| 2002/0125702 | A1* | 9/2002 | Ohhashi | B60R 21/18 280/733 |

* cited by examiner

SEATBELT ASSEMBLY

BACKGROUND

A vehicle restraint system may include a seatbelt assembly that secures the occupant of a vehicle against harmful movement that may result from a vehicle collision. The seatbelt assembly functions to reduce the likelihood of injury by reducing the force of occupant impacts with vehicle interior structures. In this role, the seatbelt assembly applies loads across the chest or lap of the occupant.

DETAILED DESCRIPTION

Figure 1:
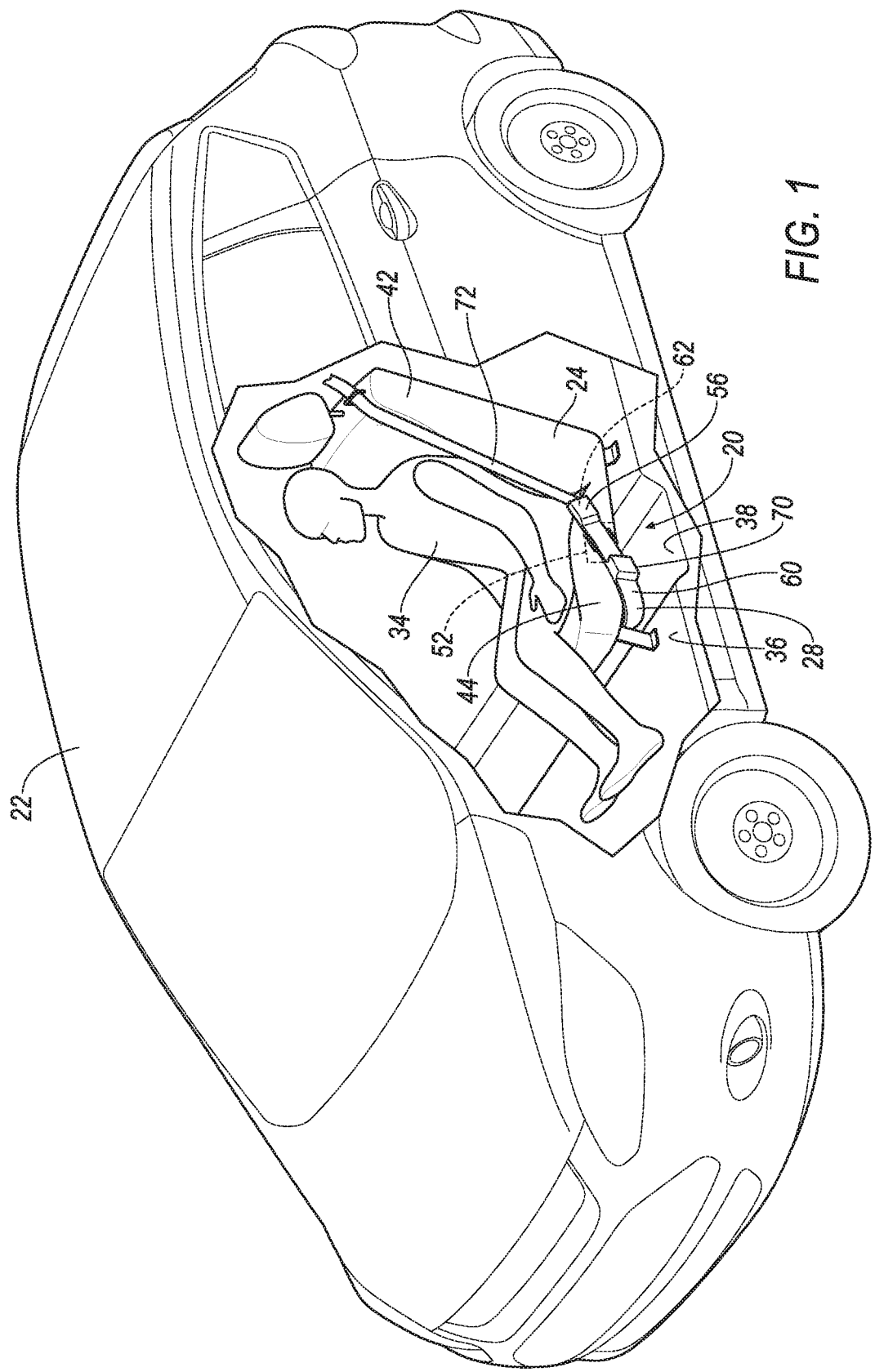
FIG. 1 is a perspective view of a vehicle including a seatbelt assembly.

An assembly includes a seat. The assembly includes a buckle supported by the seat. The assembly includes a buckle mechanism pivotable relative to the seat between a stowed position and a latching position, and having a carrier movable between a retracted position and an extended position. The assembly includes a latch plate supported by the carrier and engaged with the buckle when the buckle mechanism is in the latching position and the carrier is in the extended position.

The seat can include a seat bottom having a first side and a second side spaced from the first side in a cross-seat direction, the buckle mechanism pivotally supported at the first side and the second side.

The buckle mechanism can include a cover, the carrier slidable within the cover to move between the retracted position and the extended position.

The assembly can include a motor supported by the cover and having a pinion, the carrier including a rack engaged with the pinion.

The assembly can include a webbing, the webbing disposed within the carrier.

The buckle mechanism can include a first end and a second end opposite the first end, the latch plate supported at the first end and the buckle fixed to the second end.

The buckle mechanism can be arcuate.

The buckle mechanism can be under the seat.

The buckle mechanism can include an end, the latch plate supported at the end, and the end in the latching position can be above the end in the stowed position relative to the seat.

The buckle mechanism can include an end, the latch plate supported at the end, and the end in the latching position can be forward of the end in the stowed position relative to the seat.

The assembly can include a processor and a memory storing instructions executable by the processor to actuate the buckle mechanism to pivot from the stowed position to the latching position, and then to actuate the carrier from the retracted position to the extended position.

The memory can store instructions executable by the processor to actuate the buckle mechanism in response to detecting an occupant in the seat.

The memory can store instructions executable by the processor to actuate the carrier from the extended position to the retracted position, and then to actuate the buckle mechanism to pivot from the latching position to the stowed position.

The memory can store instructions executable by the processor to actuate the buckle mechanism in response to detecting the latch plate being engaged with the buckle.

The seat can include a seat bottom, the buckle mechanism pivotally supported by the seat bottom.

The carrier in the extended position can be above the seat.

The buckle mechanism can be circular when the carrier is in the extended position.

The assembly can include a retractor supported by the buckle mechanism.

The assembly can include a servo designed to move the buckle mechanism between the stowed position and the latching position.

The assembly can include a floor having a recess, the seat supported by the floor and the buckle mechanism disposed within the recess when the buckle mechanism is the latching position.

With reference to the Figures, wherein like numerals indicate like parts throughout the several views, a seatbelt assembly 20 for a vehicle 22 includes a seat 24. The seatbelt assembly 20 includes a buckle 26 supported by the seat 24. The seatbelt assembly 20 includes a buckle mechanism 28 pivotable relative to the seat 24 between a stowed position and a latching position, and having a carrier 30 movable between a retracted position and an extended position. The seatbelt assembly 20 includes a latch plate 32 supported by the carrier 30 and engaged with the buckle 26 when the buckle mechanism 28 is in the latching position and the carrier 30 is in the extended position.

The seatbelt assembly 20 operates to restrain an occupant 34 relative to the seat 24, e.g., by pivoting the buckle mechanism 28 to the latching position and moving the carrier 30 to the extended position, without requiring input from the occupant 34, e.g., without the occupant 34 having to buckle themselves into the seat 24.

The vehicle 22, shown in FIGS. 1-3, and 6-13, may be any passenger or commercial automobile such as a car, a truck, a sport utility vehicle, a crossover vehicle, a van, a minivan, a taxi, a bus, etc. The vehicle 22 may include one or more seats 24, a roof, a floor 36, etc.

The floor 36, shown in FIGS. 1-3, and 6-12, supports components of the vehicle 22, such as the seats 24. The floor 36 can have a recess 38. The recess 38 is defined by a top surface 40 of the floor 36 that is lower than the top surface 40 of the floor 36 surrounding the recess 38. The floor 36 can include, beams, panels, etc. The floor 36 can be metal, plastic, or any other suitable material, including combinations thereof.

The seat 24, shown in FIGS. 1-3, and 6-12, is a bucket seat, but alternatively the seat 24 may be a bench seat or another type of seat. The seat 24 can be supported by the floor 36. For example, the seat 24 can be fixed to the floor 36 with fasteners, welding, etc. The seat 24 can be positioned relative to the floor 36 such that the recess 38 is below the seat 24.

The seat 24 may include a seat back 42, a seat bottom 44, and a head restraint. The head restraint may be supported by the seat back 42 and may be stationary or movable relative to the seat back 42. The seat back 42 may be supported by the seat bottom 44 and may be stationary or movable relative to the seat bottom 44. The seat back 42, the seat bottom 44, and/or the head restraint may be adjustable in multiple degrees of freedom. Specifically, the seat back 42, the seat bottom 44, and/or the head restraint may themselves be adjustable, in other words, adjustable components within the seat back 42, the seat bottom 44, and/or the head restraint, and/or may be adjustable relative to each other.

Figure 6:
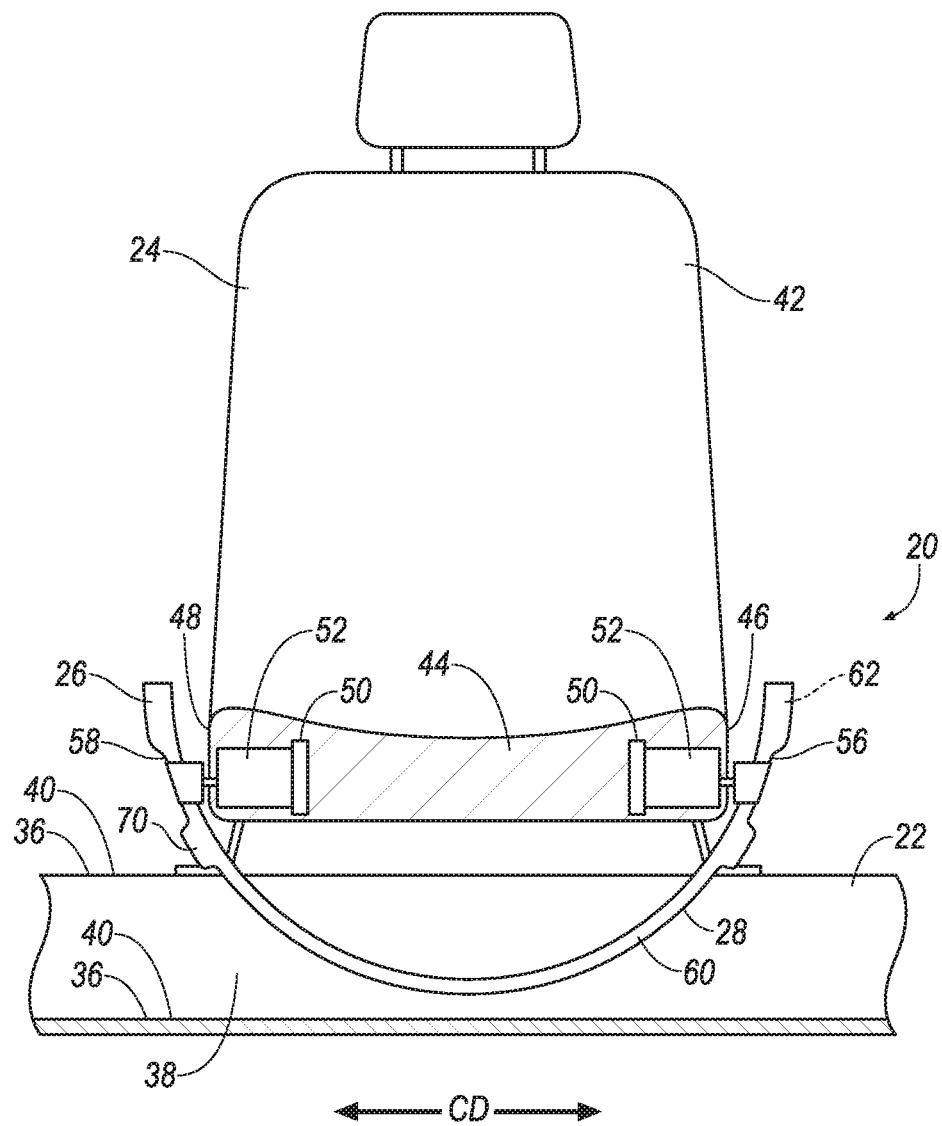
FIG. 6 is a front view of the seatbelt assembly of FIG. 1 in a latching position and the carrier in the retracted position.
Figure 7:
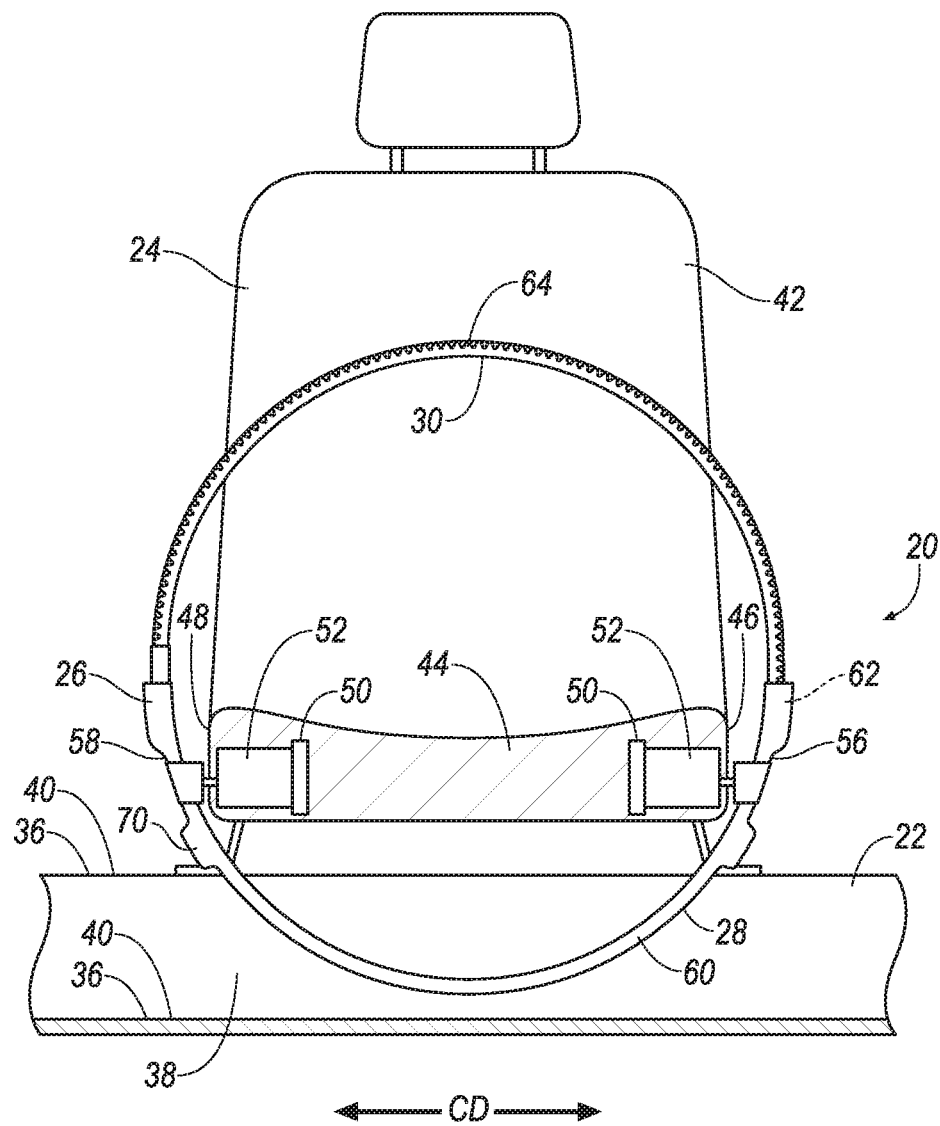
FIG. 7 is a front view of the seatbelt assembly of FIG. 1 in the latching position and the carrier in an extended position.

The seat bottom 44 have a first side 46 and a second side 48 spaced from the first side 46 in a cross-seat direction CD, shown in FIGS. 6 and 7. The cross-seat direction CD extends between a right side of the seat 24 and a left side of the seat 24. The right side and the left side are relative to the occupant 34 seated in the seat 24, e.g., seated on the seat bottom 44 and resting on the seat back 42 and the head restraint.

The seat bottom 44 and/or the seat back 42 may include a frame 50, shown in FIGS. 6 and 7, and a covering supported on the frame 50. The frame 50 may include tubes, beams, etc. The frame 50 may be formed of any suitable plastic material, e.g., carbon fiber reinforced plastic (CFRP), glass fiber-reinforced semi-finished thermoplastic composite (organosheet), etc. As another example, some or all components of the frame 50 may be formed of a suitable metal, e.g., steel, aluminum, etc.

The covering may include upholstery and padding. The upholstery may be formed of cloth, leather, faux leather, or any other suitable material. The upholstery may be stitched in panels around the frame 50. The padding may be between the covering and the frame 50, and may be foam or any other suitable material.

The buckle mechanism 28, shown in FIGS. 1-12, operates to fasten the seatbelt assembly 20, i.e., to engage the latch plate 32 with the buckle 26. The buckle mechanism 28 is pivotable relative to the seat 24 between the stowed position, shown in FIGS. 1-3, and 12, and the latching position, shown in FIGS. 6-11. For example, the buckle mechanism 28 can be pivotally supported by the seat bottom 44, e.g., with a hinge pin, or any other suitable structure permitting rotation of the buckle mechanism 28 relative to the seat bottom 44. The hinge pin may pivotally secure the buckle mechanism 28 to the frame 50. The buckle mechanism 28 can be pivotally supported at the first side 46 and the second side 48 of the seat bottom 44.

The buckle mechanism 28 may be urged from the stowed position to the latching position, and vice versa. For example, the seatbelt assembly 20 may include one or more servos 52, shown in FIGS. 1-3, and 6-12. The servos 52 are designed to move the buckle mechanism 28 between the stowed position and the latching position. Each servo 52 may include a housing, a shaft extending from the housing, a motor and gear reduction unit designed to rotate the shaft, and a position sensor designed to detect a position of the shaft relative to the housing. The housing may be fixed to the frame 50 of the seat 24, e.g., with one or more fasteners, clips, adhesive, etc. The shaft may be fixed to the buckle mechanism 28, e.g., with one or more fasteners, clips, brackets, splines, adhesive, etc. Alternately, the housing may be fixed to the buckle mechanism 28, and the shaft may be fixed to the frame 50. Actuation of the servo 52, e.g., in response to an instruction from a computer 54, causes the shaft and the buckle mechanism 28 to rotate relative to the housing and the seat 24. Other systems and structures can be used to urge the buckle mechanism 28 to rotate relative to the seat 24, such as springs, linear actuators, motors, gears, pneumatic systems, hydraulic systems, electromechanical systems, etc. (not shown).

The buckle mechanism 28 can be arcuate. For example, the buckle mechanism 28 can be semicircular when the carrier 30 is in the retracted position, as shown in FIG. 6. As another example, the buckle mechanism 28 can be circular when the carrier 30 is in the extended position, as shown in FIG. 7.

The buckle mechanism 28 can be under the seat 24, e.g., relative to the occupant 34 seated in the seat 24. For example, the buckle mechanism 28 can be disposed within the recess 38 when the buckle mechanism 28 is the latching position.

The buckle mechanism 28 can include a first end 56 and a second end 58 opposite the second end 58. The first end 56 can be spaced from the second end 58. For example, the first end 56 and the second end 58 may be opposite each other with the semicircular shape of the buckle mechanism 28 therebetween. As another example, the seat bottom 44 can be between the first end 56 and the second end 58.

The first end 56 and/or the second end 58 when the buckle mechanism 28 in the latching position can be above the first end 56 and/or the second end 58 when the buckle mechanism 28 in the stowed position, i.e., relative to the seat 24, e.g., relative to the occupant 34 seated in the seat 24. To put it another way, the first end 56 and/or the second end 58 of the buckle mechanism 28 in the latching position can be farther from the floor 36 than the first end 56 and/or the second end 58 of the buckle mechanism 28 in the stowed position.

The first end 56 and/or the second end 58 can be farther forward when the buckle mechanism 28 in the latching position as compared to the first end 56 and/or the second end 58 when the buckle mechanism 28 in the stowed position, i.e., relative to the seat 24, e.g., relative to the occupant 34 seated in the seat 24. To put it another way, the first end 56 and/or the second end 58 of the buckle mechanism 28 in the latching position can be farther from the seat back 42 than the first end 56 and/or the second end 58 of the buckle mechanism 28 in the stowed position.

The buckle mechanism 28 can include a cover 60, shown in FIGS. 1-12. The cover 60 may be semicircular. The cover 60 can have a hollow rectangular cross section. The cover 60 can be plastic, metal, or any other suitable material. The cover 60 can be pivotally supported by the seat 24 to move between the stowed position and the latching position. The cover 60 can be pivotally supported by the first side 46 and/or the second side 48 of the seat bottom 44. The first end 56 and the second end 58 of the buckle mechanism 28 can be ends of the cover 60.

The cover 60 can define a pocket 62, shown in FIGS. 1, 3, 3A, and 5-12. The pocket 62 can be at the first end 56 of the buckle mechanism 28. The pocket 62 can be sized to receive the latch plate 32.

The carrier 30, shown in FIGS. 3A-5, 7, 9 and 10, moves to engage the latch plate 32 with the buckle 26. The carrier 30 is movable, e.g., relative to the cover 60, between the retracted position, shown in FIGS. 3A and 5, and the extended position, shown in FIGS. 7 and 10. The carrier 30 in the retracted position is not visible in the other Figures, e.g., FIG. 6, as the carrier 30 is within the cover 60. The carrier 30 can be slidable within the cover 60 to move between the retracted position and the extended position. Other structures may be used to enable movement of the carrier 30, e.g., a track, a tongue and groove arrangement, a channel, etc. (not shown).

The carrier 30 in the retracted position can be below the seat 24, e.g., relative to the occupant 34 seated in the seat 24. The carrier 30 in the extended position can be above the seat 24, e.g., relative to the occupant 34 seated in the seat 24.

The carrier 30 can be plastic, metal, or any other suitable material. The carrier 30 can include a rack 64, shown in FIGS. 4, 7, 9, and 10. The rack 64 can include a plurality of gear teeth extending along an exterior of the cover 60.

Figure 4:
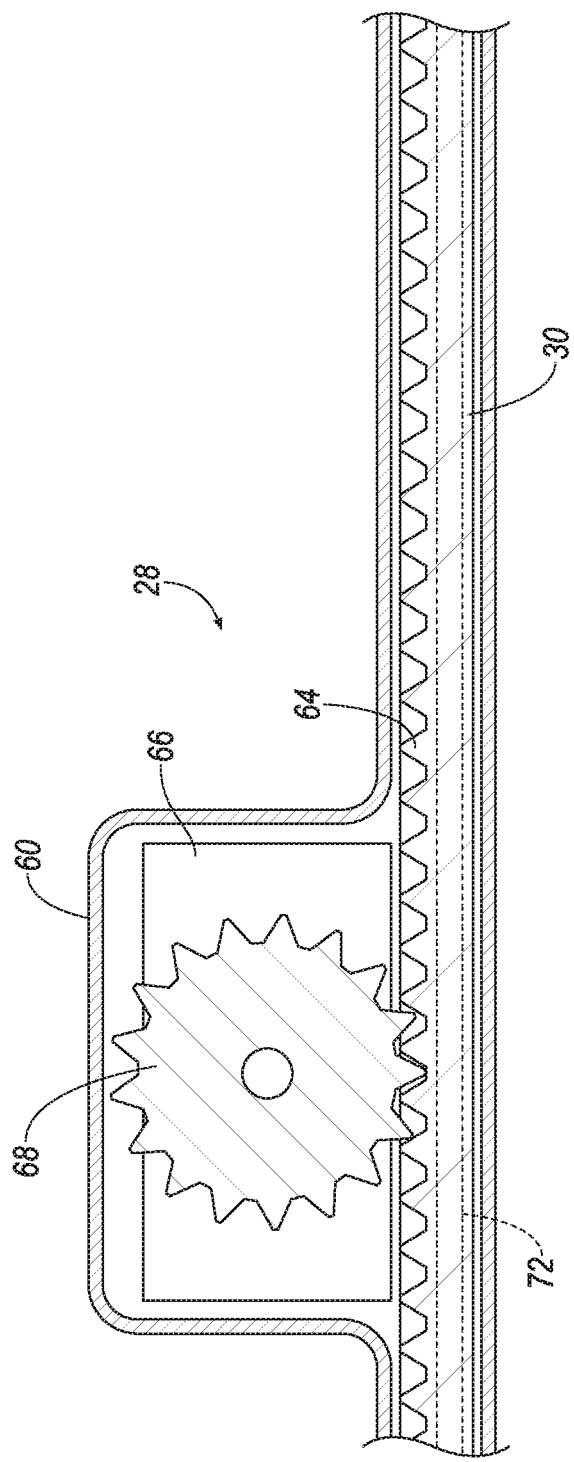
FIG. 4 is a cross section view of the seatbelt assembly along a line 4-4 in FIG. 3.
Figure 13:
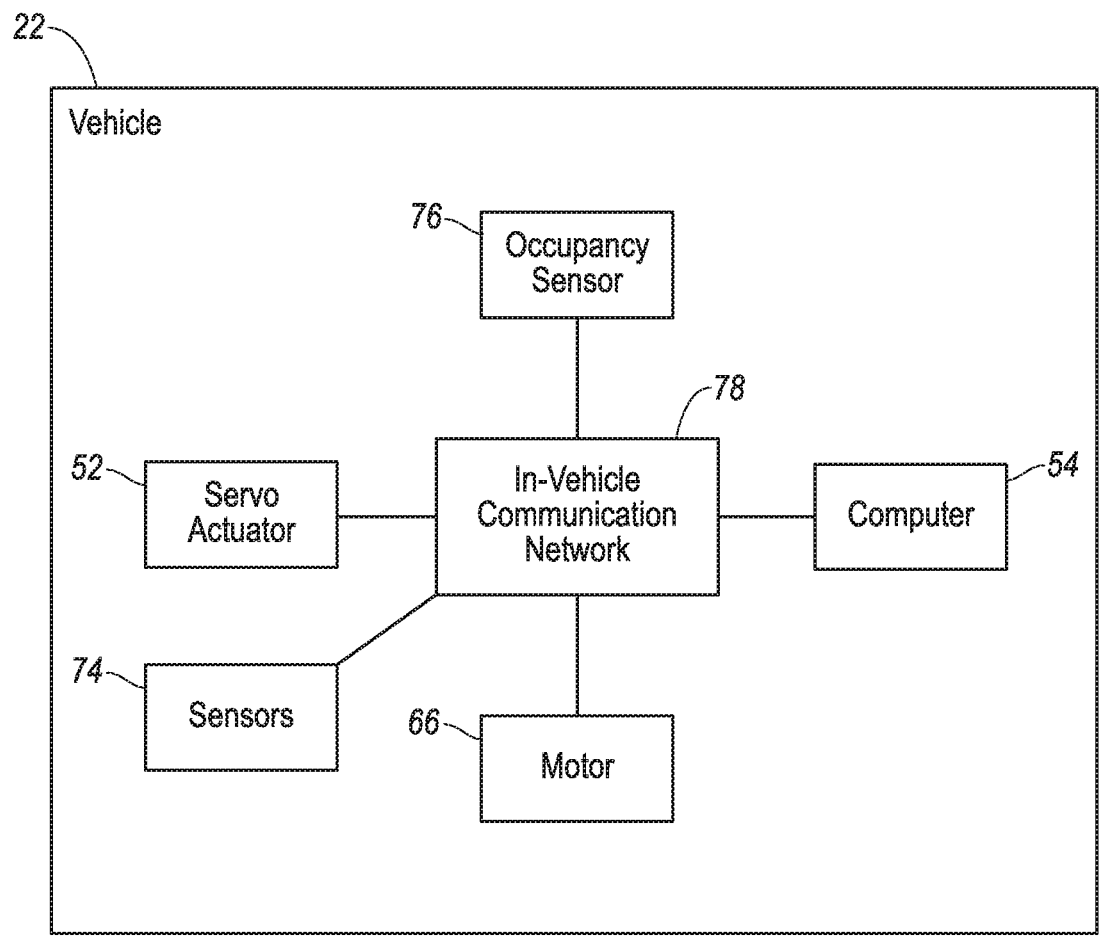
FIG. 13 is a block diagram of components of the vehicle and the seatbelt assembly.

The seatbelt assembly 20 can include a motor 66, shown in FIGS. 4 and 13. The motor 66 can be supported by the cover 60. The motor 66 can have a pinion 68 fixed to a shaft of the motor 66. The pinion 68 can be engaged with the rack 64. Actuation of the motor 66, e.g., in response to an instruction from the computer 54, moves the carrier 30 relative to the cover 60. Other systems and structures can be used to move the cover 60, e.g., linear actuators, rollers, springs, pneumatic systems, hydraulic systems, electromechanical systems, etc. (not shown).

Figure 2:
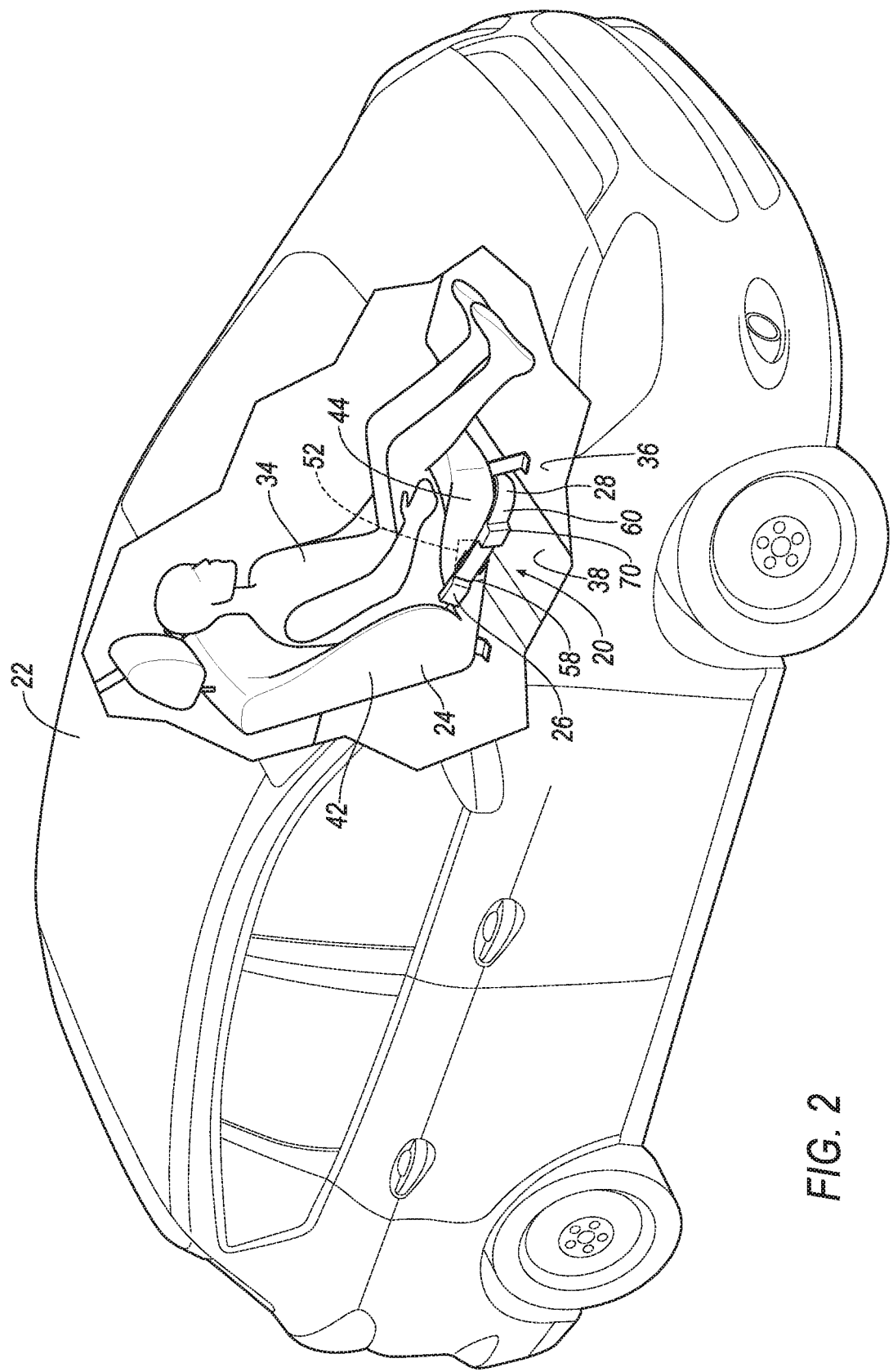
FIG. 2 is a perspective of the seatbelt assembly of FIG. 1.

The seatbelt assembly 20 may include a retractor 70, shown in FIGS. 2, 6 and 7. The retractor 70 can be supported by the buckle mechanism 28. For example, the retractor 70 can be fixed to the cover 60, e.g., with fasteners, clips, adhesives, etc. The retractor 70 may include a spool. The spool may freely rotate within the retractor 70. The spool may be adapted to receive a webbing 72, for example, by including a webbing attachment slot and permitting the webbing 72 to wind around the spool. The retractor 70 may include a locking mechanism that inhibits rotation of the spool when the vehicle 22 is subject to deceleration above a threshold amount, e.g., during the impact of the vehicle 22.

The webbing 72 may be formed of fabric in the shape of a strap. The webbing 72 may be attached to the spool, with the webbing 72 wound around the spool. The webbing 72 may be payable from the retractor 70, e.g., when the spool is not prevented from rotating by the locking mechanism. The webbing 72 may be disposed within the slot of the webbing 72 guide.

Figure 5:
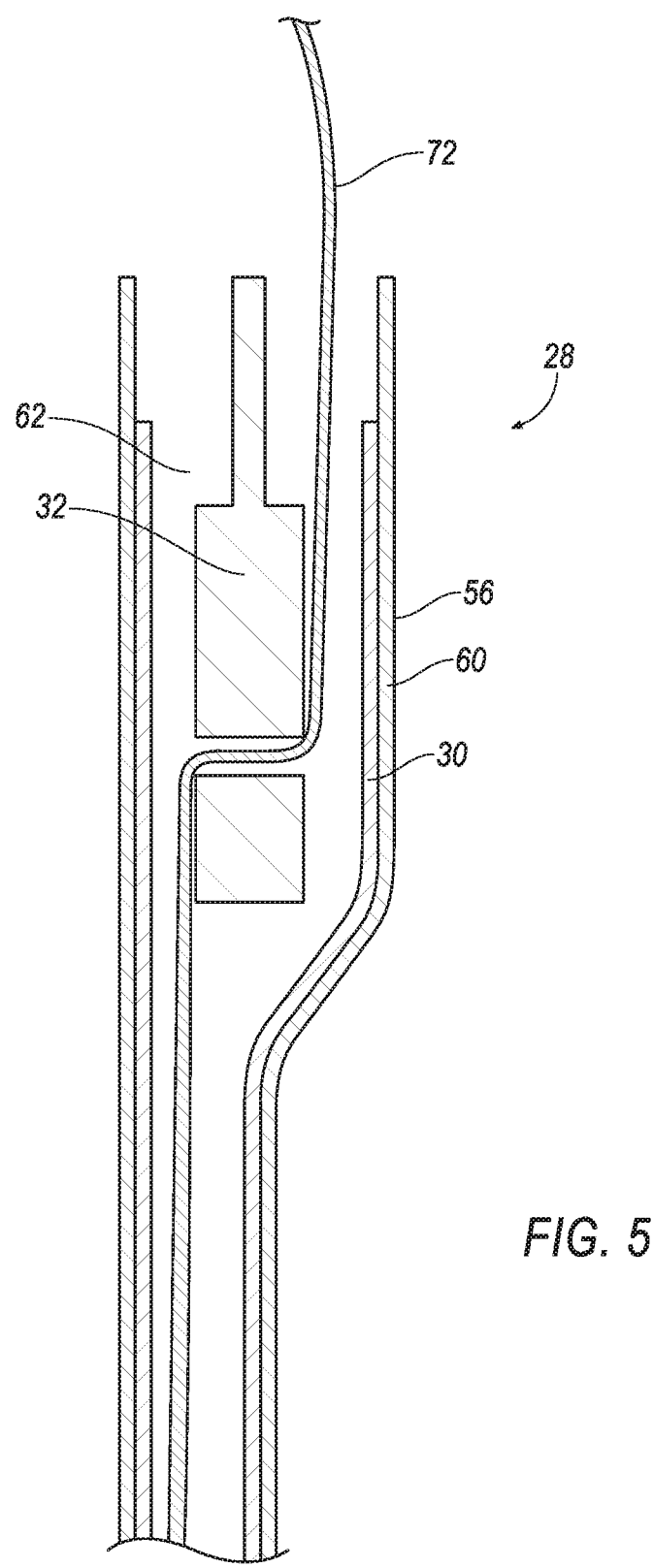
FIG. 5 is a cross section view of the seatbelt assembly along a line 5-5 in FIG. 3A.

The webbing 72 can be disposed within the carrier 30, as shown in FIGS. 4 and 5. The webbing 72 can extend within the carrier 30 from the retractor 70 and out of the first end 56.

The buckle 26, shown in FIGS. 2 and 6-11, engages with the latch plate 32 to secure the seatbelt assembly 20 and restrain the occupant 34 relative to the seat 24. For example, the latch plate 32 can be engaged with the buckle 26 when the buckle mechanism 28 is in the latching position and the carrier 30 is in the extended position.

The buckle 26 may include a latch, or any other suitable structure, to engage the latch plate 32. The buckle 26 may include a button, actuator, etc., to disengage the latch plate 32 from the buckle 26, e.g., in response to input from the occupant 34, an instruction from the computer 54, etc. The buckle 26 is supported by the seat 24. For example, the buckle 26 can be fixed to the second end 58 of the buckle mechanism 28, e.g., to the cover 60 and with fasteners, clips, etc.

Figure 3:
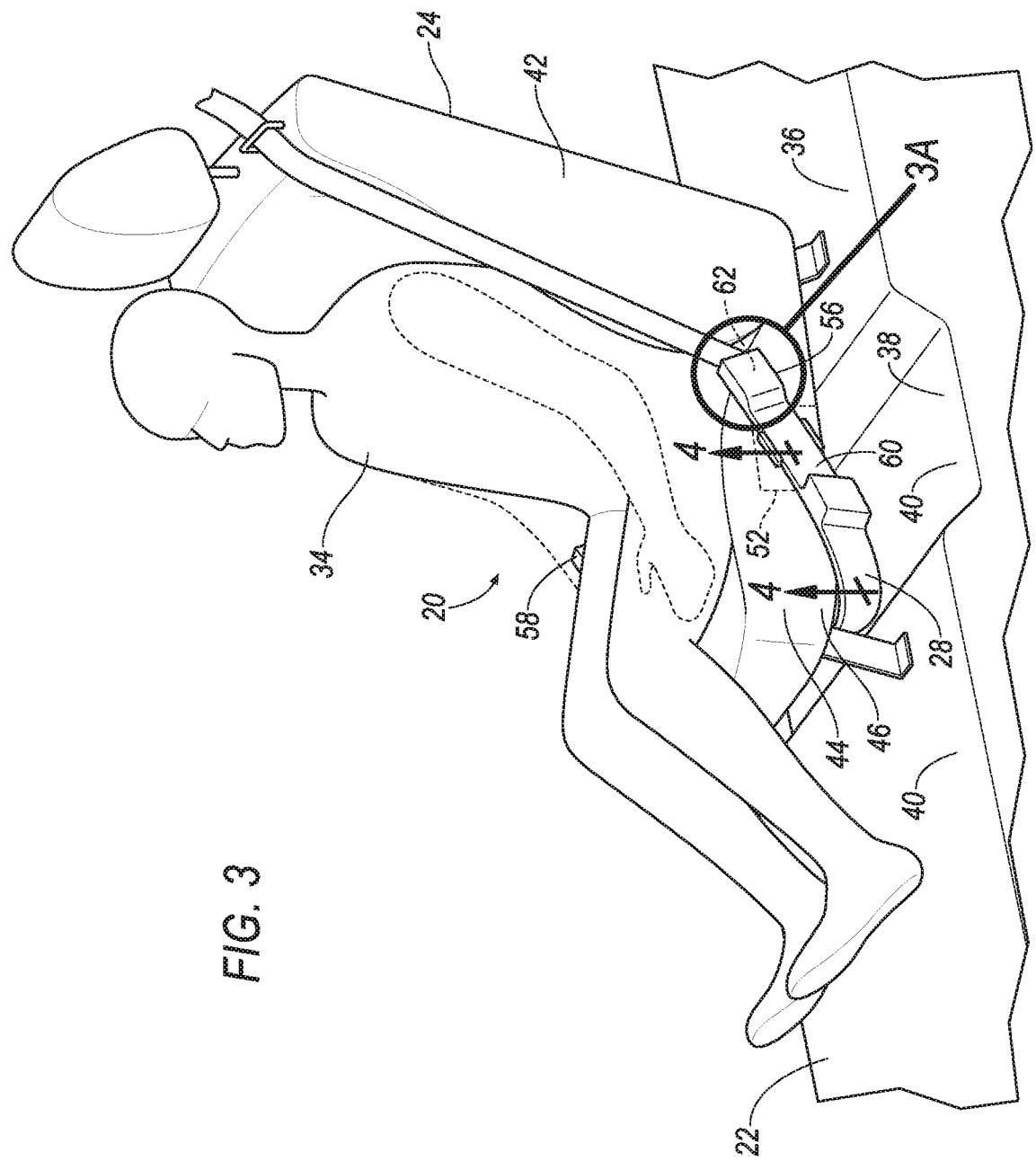
FIG. 3 is a perspective of the seatbelt assembly of FIG. 1 in a stowed position and a carrier in a retracted position.
Figure 3A:
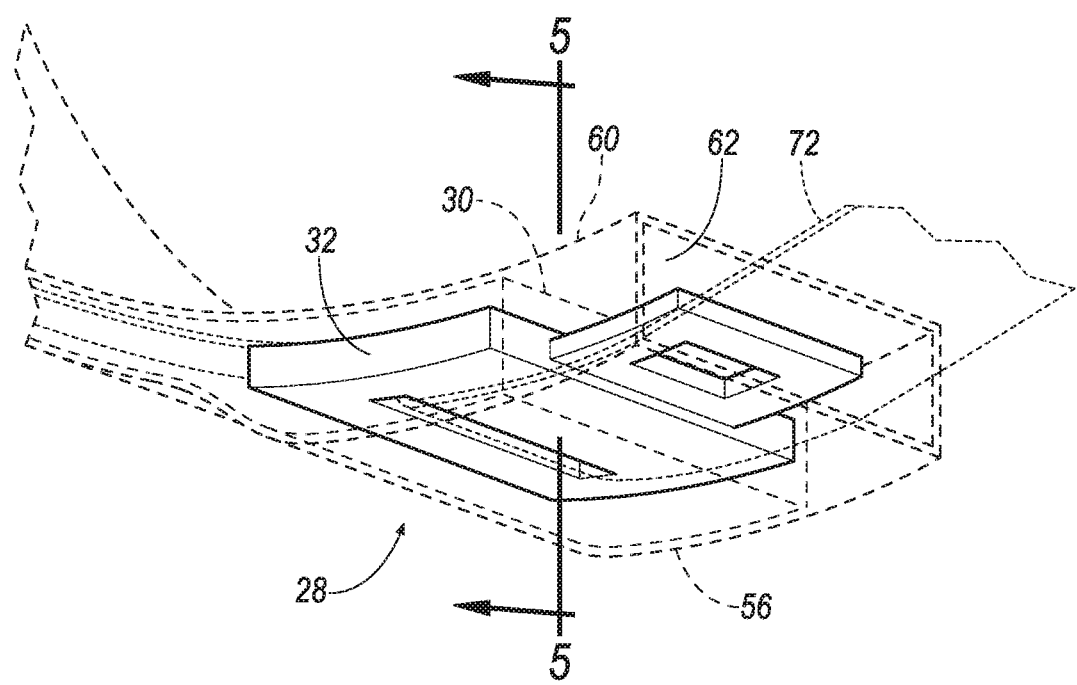
FIG. 3A is an enlarged perspective of a portion of FIG. 3.

The latch plate 32 can be rectangular or any other suitable shape. The latch plate 32 can include a hole, a notch, etc., to receive the latch of the buckle 26. The latch plate 32 is supported by the carrier 30. The latch plate 32 can be supported at the first end 56. For example, the latch plate 32 can be in the pocket 62, as shown in FIGS. 3A, and 5.

The seatbelt assembly 20 and/or vehicle 22 may include one or more sensors 74, shown in FIG. 13. The sensors 74 may detect various states and positions of the seatbelt assembly 20. For example, one or more sensors 74, e.g., proximity sensors, may be supported by the seat 24 and designed to detect when the buckle mechanism 28 is in the latching position. As other example, one or more sensors 74 e.g., proximity sensors, may be supported by the buckle 26 and designed to detect when the latch plate 32 is engaged with the buckle 26. The sensors 74 may be other types, e.g., contact switches, cameras, etc.

The seatbelt assembly 20 and/or vehicle 22 may include an occupancy sensor 76, shown in FIG. 13, programmed to detect occupancy of the seat 24. The occupancy sensor 76 may be visible-light or infrared cameras directed at the seat 24, weight sensors, or other suitable sensors.

The seatbelt assembly 20 and/or vehicle 22 may include a communication network 78, shown in FIG. 13. The communication network 78 includes hardware, such as a communication bus, for facilitating communication among components, e.g., the motor 66, the servo(s) 52, the sensor(s) 74, the occupancy sensor 76, the computer 54, etc. The communication network 78 may facilitate wired or wireless communication among the components in accordance with a number of communication protocols such as computer area network (CAN), Ethernet, WiFi, Local Interconnect Network (LIN), and/or other wired or wireless mechanisms.

The computer 54, shown in FIG. 13, may be a microprocessor-based computer implemented via circuits, chips, or other electronic components. For example, the computer 54 may include a processor, a memory, etc. The memory of the computer 54 may include memory for storing programming instructions executable by the processor as well as for electronically storing data and/or databases.

The computer 54 may be programmed to actuate the buckle mechanism 28 to pivot from the stowed position to the latching position, and then to actuate the carrier 30 from the retracted position to the extended position. For example, the computer 54 may transmit an instruction to the servo(s) 52 via the communication network 78 instructing the servo (s) 52 to actuate to pivot the cover 60 to place the buckle mechanism 28 in the latching position. Next, the computer 54 may transmit an instruction to the motor 66 via the communication network 78 instructing the motor 66 to actuate to move the carrier 30 relative to the cover 60 and to the extended position. Alternately or additionally, the computer 54 may instruct such actuation in response to receiving input from the occupant 34, e.g., via a user interface, such as a button or touch screen, of the seat 24 assembly and/or vehicle 22 in communication with the computer 54 via the communication network 78.

The computer 54 may be programmed to actuate the buckle mechanism 28 in response to detecting an occupant 34 in the seat 24. For example, the computer 54 may receive data from the occupancy sensor 76 via the communication network 78 indicating the seat 24 is occupied. In response to receiving such data, the computer 54 may actuate the buckle mechanism 28, e.g., to pivot the cover 60 to place the buckle mechanism 28 in the latching position and to move the carrier 30 to the extended position, e.g., as described herein.

The computer 54 may be programmed to actuate the carrier 30 from the extended position to the retracted position, and then to actuate the buckle mechanism 28 to pivot from the latching position to the stowed position. For example, the computer 54 may transmit an instruction to the motor 66 via the communication network 78 instructing the motor 66 to actuate to move the carrier 30 relative to the cover 60 and to the retracted position. Next, the computer 54 may transmit an instruction to the servo 52 via the communication network 78 instructing the servo 52 to actuate to the pivot the cover 60 to place the buckle mechanism 28 in the stowed position.

The computer 54 may be programmed to actuate the buckle mechanism 28 in response to detecting the latch plate 32 being engaged with the buckle 26. For example, the computer 54 may receive data from the sensors 74 via the communication network 78 indicating the latch plate 32 is engaged with buckle 26. In response to receiving such data, the computer 54 may actuate the buckle mechanism 28, e.g., to move the carrier 30 to the retracted position and to pivot the cover 60 to place the buckle mechanism 28 in the stowed position, e.g., as described herein.

Figure 8:
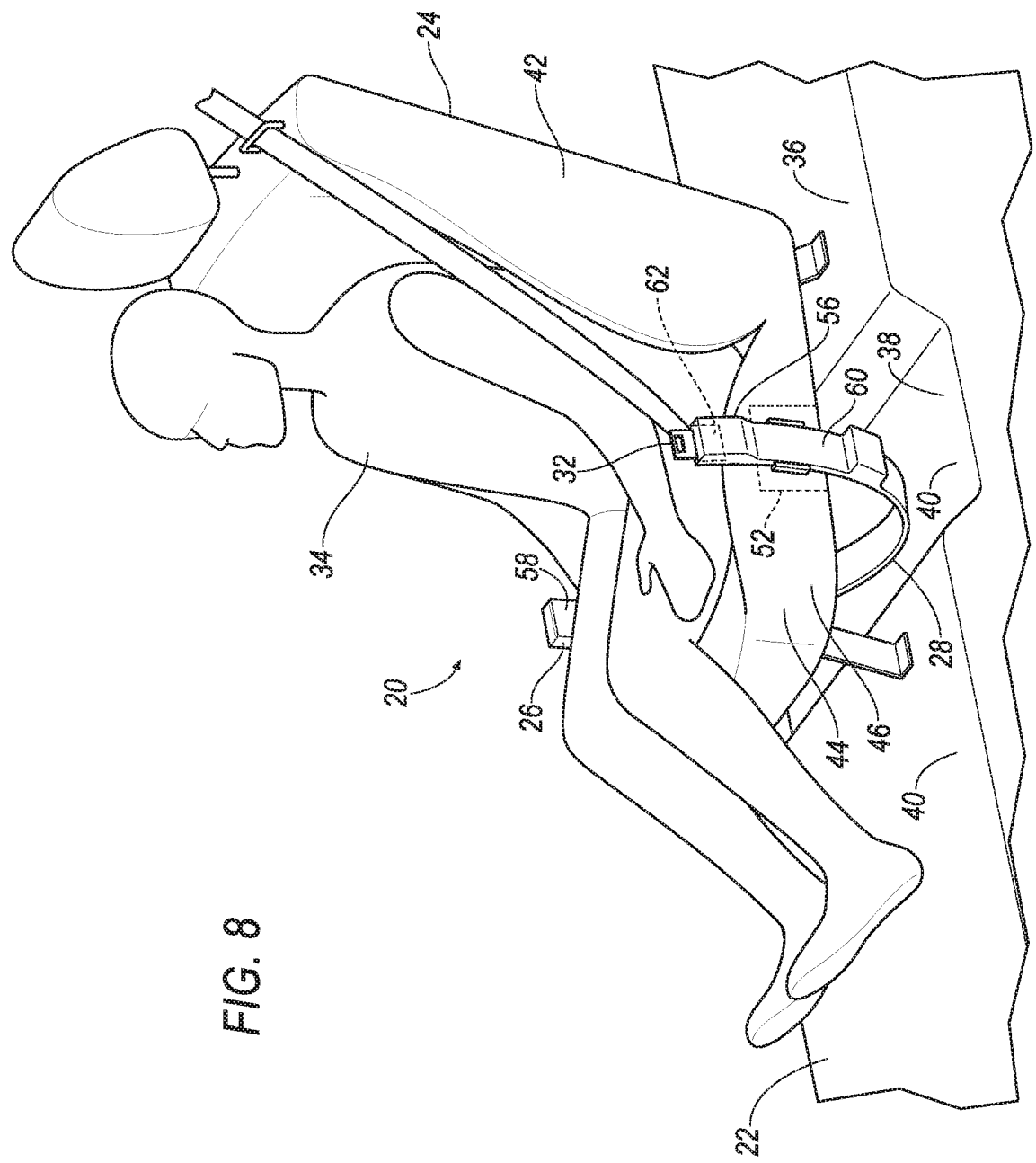
FIG. 8 is a perspective view of the seatbelt assembly of FIG. 1 in the latching position and the carrier moving to the extended position.
Figure 9:
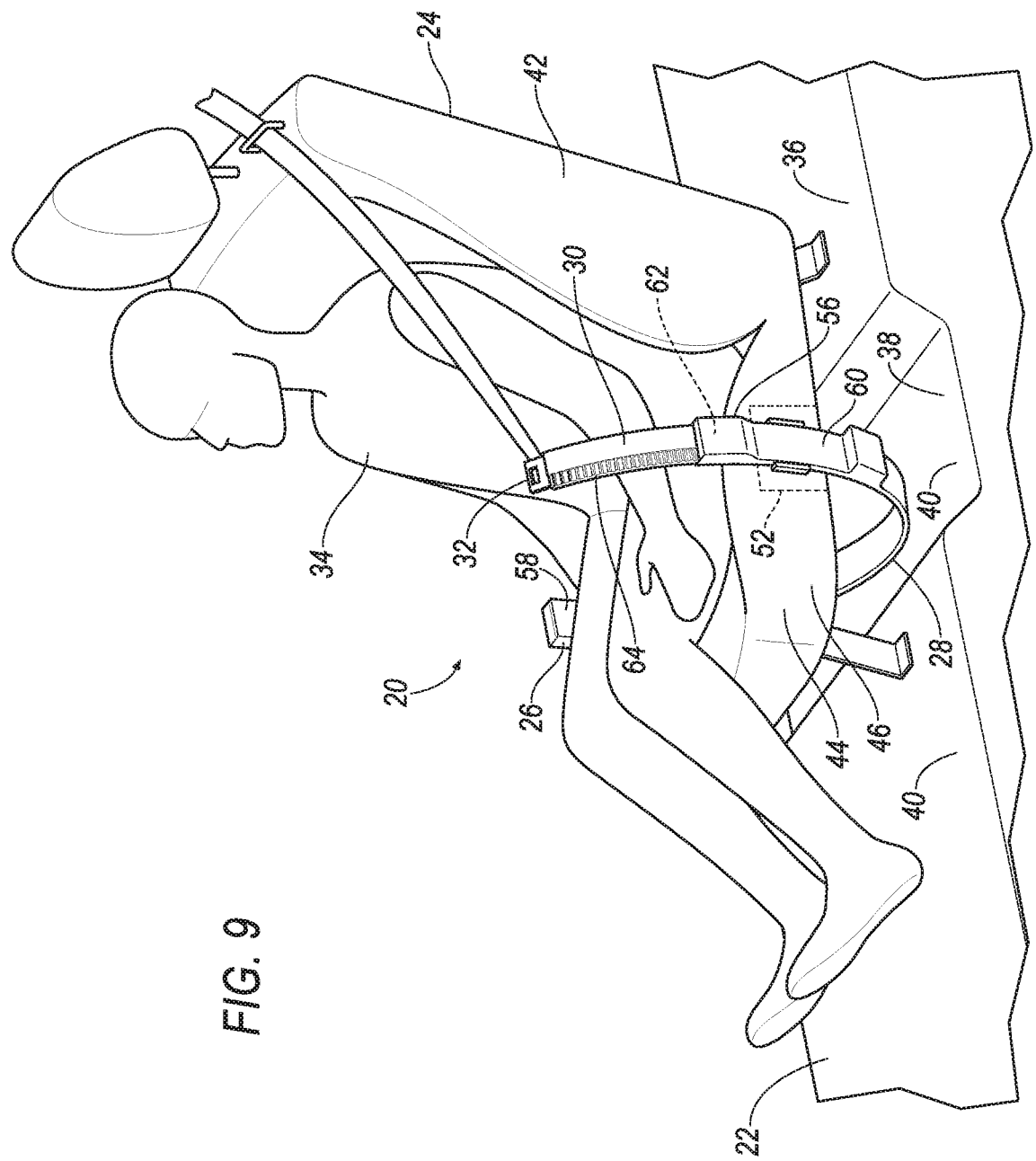
FIG. 9 is a perspective view of the seatbelt assembly of FIG. 1 in the latching position and the carrier moving to the extended position.
Figure 10:
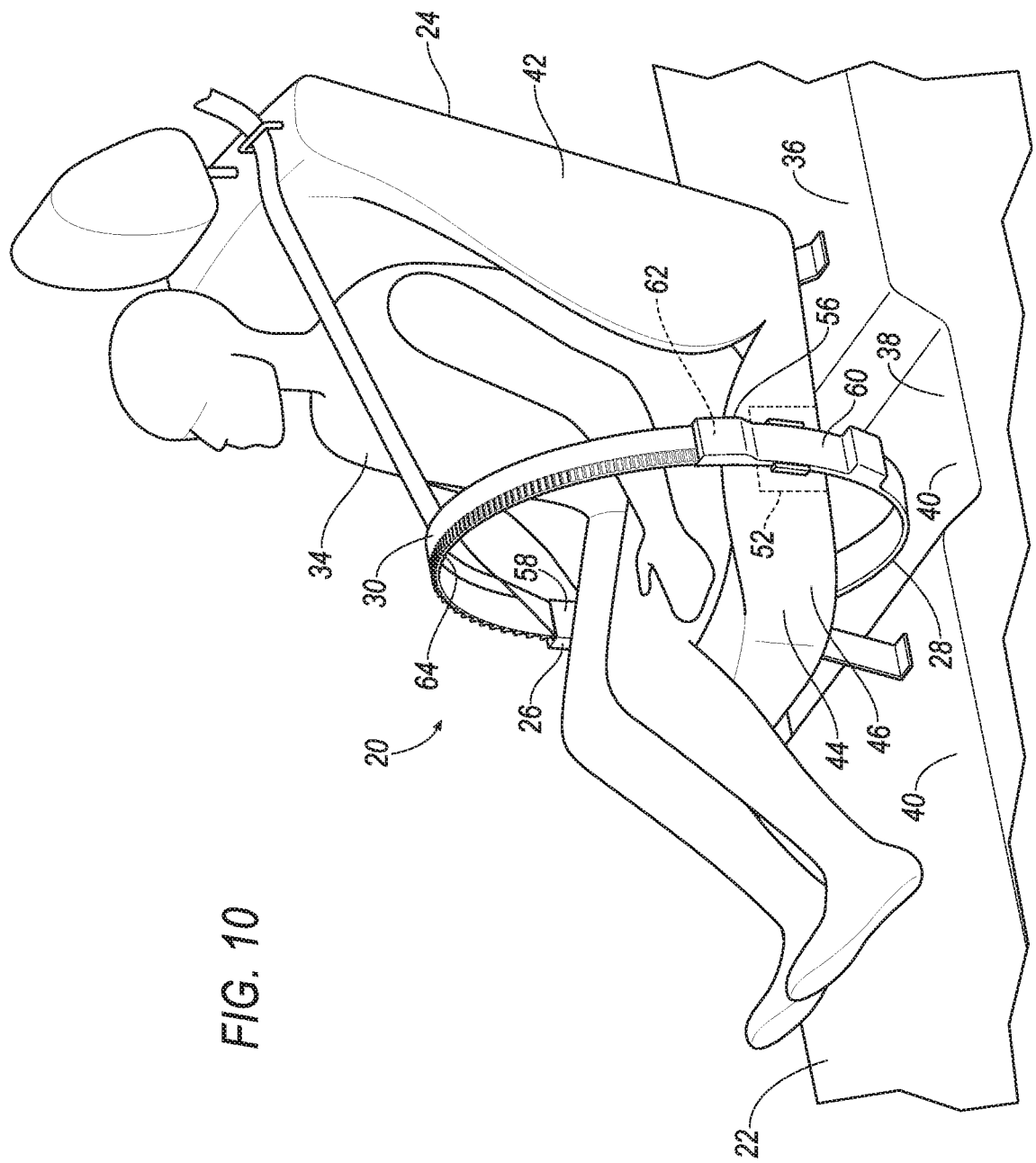
FIG. 10 is a perspective view of the seatbelt assembly of FIG. 1 in the latching position and the carrier in the extended position.
Figure 11:
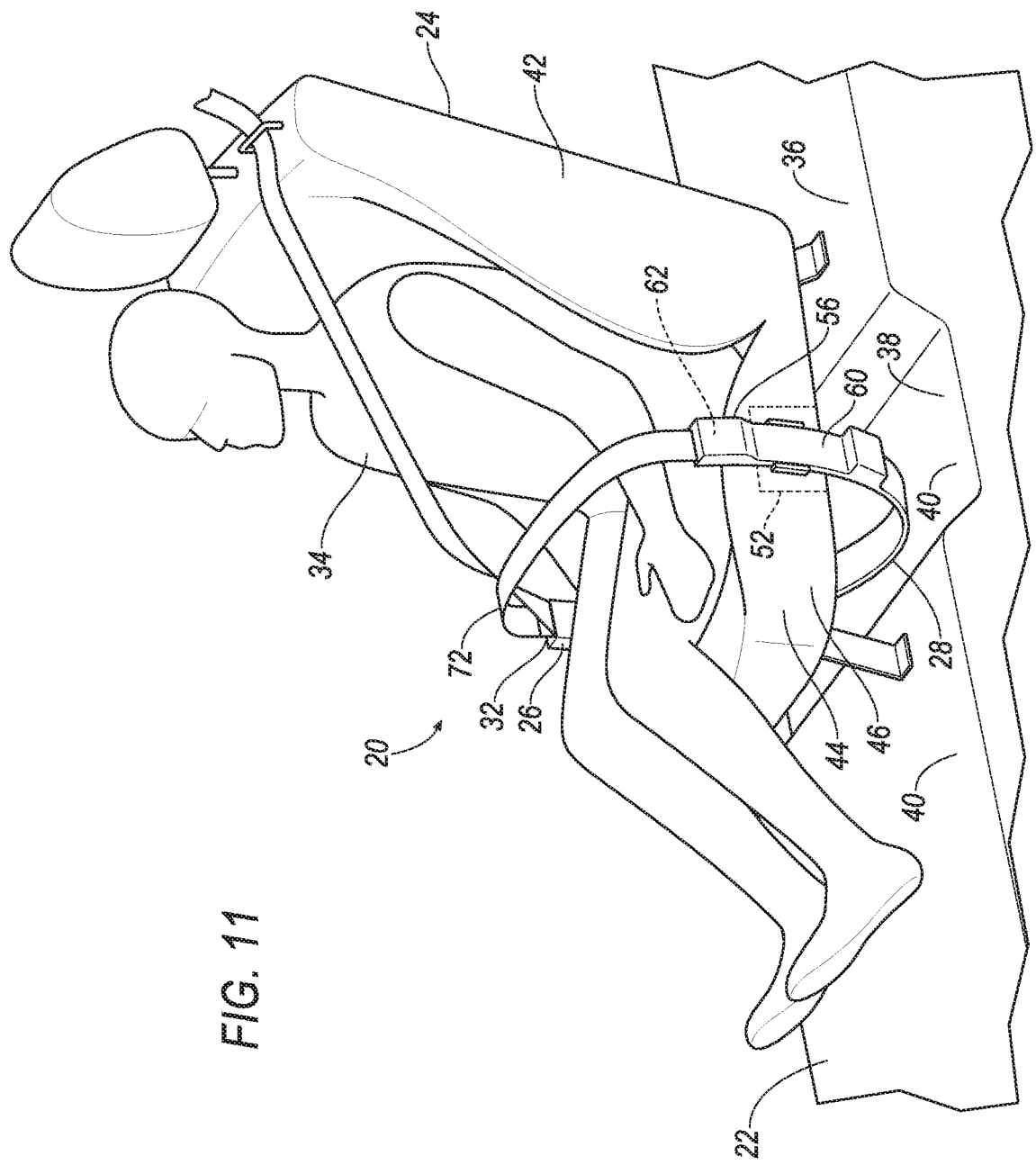
FIG. 11 is a perspective view of the seatbelt assembly of FIG. 1 in the latching position and the carrier in the retracted position with a latch plate engaged with a buckle.
Figure 12:
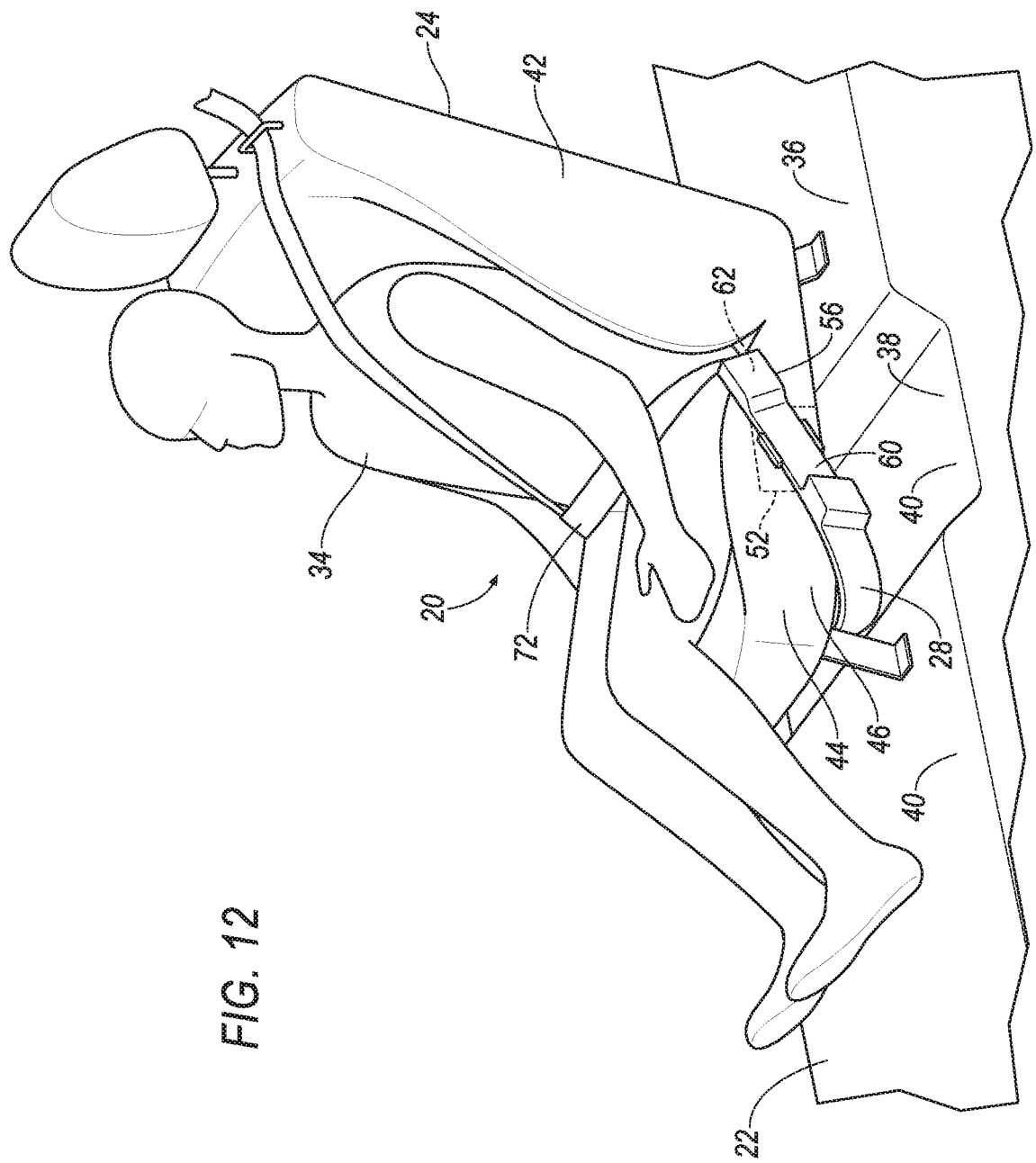
FIG. 12 is a perspective view of the seatbelt assembly of FIG. 1 in the stowed position and the carrier in the retracted position with the latch plate engaged with the buckle.

In operation, and prior to the occupant 34 occupying the seat 24, the buckle mechanism 28 can be in the stowed position, the carrier 30 can be in the retracted position, and the latch plate 32 can be in the pocket 62 of the carrier 30. After the occupant 34 occupies the seat 24, the buckle mechanism 28 pivots to the latching position, the carrier 30 extends to the extended position, and the latch plate 32 engages the buckle 26, as shown in FIGS. 8-10. After the latch plate 32 is engaged with the buckle 26, the carrier 30 moves to the retracted position, the buckle mechanism 28 pivots to the stowed position, and the retractor 70 retracts the webbing 72, e.g., to restrain to occupant 34 in the seat 24, as shown in FIGS. 11-12.

Computing devices, such as the computer 54, generally include computer-executable instructions, where the instructions may be executable by the processor of the computer 54. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer 54-readable medium, etc., and executes these instructions to perform one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by the computer 54 (e.g., by the processor of the computer 54). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a seat;
a buckle supported by the seat;
a buckle mechanism pivotable relative to the seat between a stowed position and a latching position, and having a carrier movable between a retracted position and an extended position; and
a latch plate supported within the carrier and engaged with the buckle when the buckle mechanism is in the latching position and the carrier is in the extended position.

2. The assembly of claim 1, wherein the seat includes a seat bottom having a first side and a second side spaced from the first side in a cross-seat direction, the buckle mechanism pivotally supported at the first side and the second side.

3. The assembly of claim 1, wherein the buckle mechanism includes a cover, the carrier slidable within the cover to move between the retracted position and the extended position.

4. The assembly of claim 1, further comprising a webbing, the webbing disposed within the carrier.

5. The assembly of claim 1, wherein the buckle mechanism includes a first end and a second end opposite the first end, the latch plate supported at the first end and the buckle fixed to the second end.

6. The assembly of claim 1, wherein the buckle mechanism is arcuate.

7. The assembly of claim 1, wherein the buckle mechanism is under the seat.

8. The assembly of claim 1, wherein the buckle mechanism includes an end, the latch plate supported at the end, and the end in the latching position is above the end in the stowed position relative to the seat.

9. The assembly of claim 1, wherein the buckle mechanism includes an end, the latch plate supported at the end, and the end in the latching position is forward of the end in the stowed position relative to the seat.

10. An assembly comprising:
a seat;
a buckle supported by the seat;
a buckle mechanism pivotable relative to the seat between a stowed position and a latching position, and having a carrier movable between a retracted position and an extended position;
a latch plate supported by the carrier and engaged with the buckle when the buckle mechanism is in the latching position and the carrier is in the extended position; and
a processor and a memory storing instructions executable by the processor to actuate the buckle mechanism to pivot from the stowed position to the latching position, and then to actuate the carrier from the retracted position to the extended position.

11. The assembly of claim 10, wherein the memory further stores instructions executable by the processor to actuate the carrier from the extended position to the retracted position, and then to actuate the buckle mechanism to pivot from the latching position to the stowed position.

12. The assembly of claim 11, wherein the memory further stores instructions executable by the processor to actuate the buckle mechanism in response to detecting the latch plate being engaged with the buckle.

13. The assembly of claim 1, wherein the seat includes a seat bottom, the buckle mechanism pivotally supported by the seat bottom.

14. The assembly of claim 1, wherein the carrier in the extended position is above the seat.

15. The assembly of claim 1, wherein the buckle mechanism is circular when the carrier is in the extended position.

16. The assembly of claim 1, further comprising a retractor supported by the buckle mechanism.

17. The assembly of claim 1, further comprising a servo designed to move the buckle mechanism between the stowed position and the latching position.

18. The assembly of claim 1, further comprising a floor having a recess, the seat supported by the floor and the buckle mechanism disposed within the recess when the buckle mechanism is the latching position.

19. An assembly comprising:
a seat;
a buckle supported by the seat;
a buckle mechanism pivotable relative to the seat between a stowed position and a latching position, and having a carrier including a rack and movable between a retracted position and an extended position, the buckle mechanism including a cover, the carrier slidable within the cover to move between the retracted position and the extended position;
a latch plate supported by the carrier and engaged with the buckle when the buckle mechanism is in the latching position and the carrier is in the extended position; and
a motor supported by the cover and having a pinion engaged with the rack of the carrier.

20. The assembly of claim 10, wherein the memory further stores instructions executable by the processor to actuate the buckle mechanism in response to detecting an occupant in the seat.

* * * * *